United States Patent [19]
Kosano et al.

[11] 3,821,418
[45] June 28, 1974

[54] PREPARATION OF ALCOHOLIC MALT BEVERAGES

[75] Inventors: Yoshiyasu Kosano, Tokyo; Shin Nakajima, Neyagawa; Masaru Yagiu, Tokyo, all of Japan

[73] Assignee: Suntory Ltd., Osaka, Japan

[22] Filed: July 26, 1972

[21] Appl. No.: 275,220

[30] Foreign Application Priority Data
Feb. 18, 1972 Japan.................................. 47-17372

[52] U.S. Cl.................................. 426/16, 426/384
[51] Int. Cl.............................................. C12c 11/04
[58] Field of Search .............. 99/31, 38, 41, 47, 48; 426/11, 13, 16, 384

[56] References Cited
UNITED STATES PATENTS
3,361,569   1/1968   Malick.................................. 99/31
3,457,082   7/1969   Malick.................................. 99/31 X FOREIGN PATENTS OR APPLICATIONS
274,225   7/1927   Great Britain OTHER PUBLICATIONS
Clerck, J. D., A Textbook of Brewing, Vol. 1, Chapman & Hall Ltd., London 1957 (pp. 408-413 & 428-431) TP570 C5CEC.2.

Primary Examiner—David M. Naff
Attorney, Agent, or Firm—Flynn and Frishauf

[57] ABSTRACT

A process of producing a malt beverage concentrate which comprises adding yeast to a wort to carry out primary fermentation, removing yeast from an unmatured malt beverage during or after the primary fermentation, concentrating said unmatured malt beverage freed from yeast and carrying out the maturation by adding yeast to the resulting concentrate and a process of producing a reconstituted malt beverage which comprises adding water and/or carbon dioxide to the concentrate after the completion of the maturation.

10 Claims, No Drawings

PREPARATION OF ALCOHOLIC MALT BEVERAGES

The purpose of the present invention is to produce malt beverages of excellent quality in a reduced lagering space by concentrating unmatured malt beverages and by maturing said concentrate, and to reduce the cost of transportation from a brewery to a market.

In the case of brewing beer, it comprises mashing for making wort from malt, boiling the wort with hop, and adding yeast to the wort to induce primary fermentation which is followed by the secondary fermentation. The time required for the entire process covering from mashing step to the final maturation step is generally 2 to 4 months. This variation occurs depending on the starting materials to be used, brewing conditions, types of beer aimed at and the like. The secondary fermentation is the most time consuming process and takes generally 1 to 3 months. Besides, as unmatured beer has to be lagered at low temperature before the completion of the maturation, this process requires vast space in a brewery, and, thereby, restricts the capacity of beer production in the brewery.

Accordingly, various investigations have been undertaken to shorten the time required for the secondary fermentation, but it always accompanied by deterioration in aroma and flavor.

As the reduction in volume facilitates the storage of beer in a brewery and the transportation from the brewery to the market, many investigations have been focused on making a concentrated beer. The concentrated beer may be served following the addition of water and/or carbon dioxide, if necessary.

Various methods have already been employed in concentrating beer. The concentration of beer without removing yeast, leads to serious damage to the yeast, which prevents the secondary fermentation and results in an undrinkable product both in aroma and in flavor. Therefore, it is indispensable to remove yeast from the beer prior to the process of concentration. But the removal of yeast prevents the secondary fermentation and, thereby, the maturation of beer. Therefore, all concentration procedures are only applicable to the well matured beer, and afford little advantages as to the capacity of the brewery.

For the acceleration of the maturation during the concentration process, various investigations were made, but failed in obtaining satisfactory results as far as aroma and flavor concerned.

Methods of producing concentrated beer and the ways of converting concentrated beer to the reconstituted ones are summarized as follows.

In U.S. Pat. No. 3,193,395, there is a description on cooling of the fermented beer containing 10-200 ppm of a liquid polydimethylsiloxane antifoam agent until it forms a crystal slurry having a slurry concentration of 20-75 wt percent and consisting of ice crystals and mother liquor, subjecting said slurry with agitation to sub-atmospheric pressure in the range of about 1 to 10 p.s.i.a. thereby inducing removal of substantially all of carbon dioxide from said slurry, and passing said slurry into a confined zone wherein said ice crystals are passed in a compact mass into a body of crystal melt formed by melting said ice crystals in a downstream portion of said zone while melt is displaced into said crystal mass and mother liquor is withdrawn as a concentrated solution from an upstream portion of said zone. This is one kind of concentrating method by crystallization.

U.S. Pat. No. 3,323,920 relates to a method of producing near beer. According to this method, beer from fermentation having 90-95 percent water, 2-5 percent alcohol and about 4-6 percent sugar is introduced into a cooling zone whereby 20 to 60 weight percent ice crystals are formed in a mother liquor, the formed slurry is introduced into a purification zone wherein said ice crystals are countercurrently water with a body of ice crystal melt, and purified wate is then withdrawn. The amount of this water is 50-90 percent. On the other hand, mother liquor from said purification zone is fractionally distilled at 100-150°F to remove excess alcohol and a portion of the remaining water, and a near beer concentrate having an alcohol content less than 0.75 percent weight part based on the original 100 weight parts of beer and a sugar content in the range of 95 to 100 weight parts of the original sugar content is obtained from the bottom of said purification zone. This concentrate can be reconstituted to a near beer by addition of water. This concentrating method is one kind of concentrating method by a combination of crystallization and distillation.

U.S. Pat. No. 3,323,919 is also concerned to a process for preparing a fermented malt beverage, which comprises concentrating by freeze crystallization.

A method disclosed in U.S. Pat. No. 3,295,988 is intended to concentrate by fractional crystallization with recycling mother liquor. According to this method, a cooled slurry of beer ice crystals and mother liquor is introduced into an elongated confined separation zone to separate said ice crystals. A portion of the ice crystal melt withdrawn in this case is recycled to use it to melt ice crystals. Further, a portion of concentrated mother liquor is also recycled.

B.P. 1,092,458 relates to a method of producing a beer concentrate in which beer is treated in a thin film evaporator at a temperature below 70° C at a subatmospheric pressure.

U.S. Pat. No. 3,403,029 relates to a method for producing a reconstituted beer which comprises concentrating a fermented beer by fractional crystallization, mixing the beer concentrate with the separated water phase containing precipitated and agglomerated particles of dissolved impurities, taste bodies and the like, holding the mixture in the heated state and filtering the mixture. A feature of this method is to improve the taste of reconstituted beer by contacting again agglomerated particles containing taste bodies with a concentrate.

B.P. 1,172,833 is on a method of concentrating beer after removal of insolubles by cooling it to the slightly above the freezing point.

Methods shown above, are constructed on the principles such as mere fractional crystallization, fractional crystallization with its mother liquor recycled, evaporation under reduced pressure and the combined application of these procedure. At the same time, various methods of reconstitution of beer have appeared. All these methods are, however, applicable only to the well matured beer as already mentioned. Therefore, they are unsatisfactory from the original purpose of increasing the capacity of beer production.

The present invention provides a satisfactory method of preparing well matured malt beverages having excellent aroma and good flavor by maturing an unmatured malt beverage concentrate, and allows one to carry out the maturation process in less lagering space, and facilitates the transportation of malt beverage from a brewery to a market.

The present invention comprises the following steps: to remove yeast from unmatured malt beverages during the course of or at the end of the primary fermentation or during the course of the secondary fermentation, to concentrate said unmatured malt beverage freed from yeast, and to add yeast to the concentrate to ensure the maturation. The present invention also includes a method of producing concentrated or reconstituted malt beverages by the addition of water and/or carbon dioxide to the concentrated matured malt beverages.

In the category of malt beverages mentioned here, is included any alcoholic malt beverage produced in any way from fermented wort regardless of the differences of the process required for their production. For instance, when the method described in the present invention is applied to the production of pale lager beer, dark beer, high alcoholic beer, low alcoholic beer and the alike, the maturation of concentrated malt beverages yields high quality product. Furthermore, depending on the conditions employed, shortening of the time required for the maturation occurs.

Unmatured malt beverages of different stages from the start of the primary fermentation to the end of the secondary fermentation, can be used for concentration.

The words "primary fermentation" herein used, mean a process of fermentation which is initiated by the addition of yeast to a wort. The notion of the "secondary fermentation" indicates the process of storage of unmatured malt beverage following the primary fermentation until it acquires characteristic aroma and flavor of the matured malt beverage. In the notion of the "secondary fermentation," socalled "Ruh Storage" is included. When the secondary fermentation is carried out at low temperature under pressure, the physico-chemical stability of malt beverage is increased and the dissolution of carbon dioxide into malt beverage is enchanced.

For the removal of yeast from unmatured malt beverages, any method employed in brewing, e.g., filtration through filter press, centrifugation and sedimentation can be used.

The concentration of unmatured malt beverages free from yeast, can be done by any method, e.g. fractional crystallization with or without recycling its mother liquor, vacuum evaporation and combinations thereof. Generally, 30–80 percent of water originally present in unmatured malt beverages may be removed by these methods.

For the initiation of the secondary fermentation of the concentrated malt beverage, any preparation and form of yeast may be used as a source of yeast, e.g., pure cultured yeast, young fermenting beer, yeast sediment recovered from fermentation vessels and yeast removed from malt beverage prior to its concentration.

Amount of yeast to be added varies depending on the degree of maturation of malt beverage used for concentration. Maturation of concentrated malt beverage can be attained with lower yeast density than those employed in the routine ways of brewing for the maturation of unconcentrated beer. Namely, more than $10^7$ cells/ml. of yeast is generally required to initiate the secondary fermentation of pale lager beer, whereas only about $10^5$–$10^7$ cells/ml. of yeast is enough to bring about the maturation of unmatured beer concentrate.

Time required for the maturation after the addition of yeast to the concentrate is generally 3–14 days. This variation is due to the degree of maturation of beer used, strain of yeast added, concentration of yeast and the preparation of adding yeast and the temperature at which the beer is lagered. Depending on the conditions employed, the time required for the maturation can be shortened.

As shown in the Tables, pale lager beer on which primary fermentation was conducted for 10 days at 8° C, generally requires 2 months at 0° C for the complete maturation. In contrast, only about 14 days are required for the 1.8 fold concentration of unmatured pale lager beer, prepared immediately after the removal of yeast from the beer at the final stage of its primary fermentation.

It is possible to use the matured beer concentrate prepared according to this method as the finished product with or without adding extra carbon dioxide. The matured beer concentrate is also reconstituted to beer of any desired concentration by adding water with or without carbon dioxide. As shown in the Tables, the reconstituted beer is superior in aroma and flavor to beer which was matured by conventional ways.

If the method described in the present invention is employed for the production of malt beverages, the secondary fermentation which needs the largest space and takes the longest time, can be conducted in smaller space and in shorter duration. Thus, the improvement by the present invention in the process of brewing, raises the efficiency of facilities for brewing. Furthermore, transportation of the malt beverage produced by this method from a brewery to a remote market can be done in its concentrated form and even the continuation of the maturation process there becomes possible. When the maturation of malt beverage is conducted according to the process described in the present invention, it yields high quality product organoleptically not only as the concentrated malt beverage but also as the reconstituted one. Results are summarized in the Examples cited below.

EXAMPLES 1–7 AND REFERENCE EXAMPLE 1

For the production of pale lager beer, a wort containing 10.4–10.5 percent extract was prepared according to the conventional method. Yeast was added to the wort to initiate the primary fermentation, which lasted for 5–10 days at the temperature between 7°–10° C. The initial density of yeast was 1–2×$10^7$ cells/ml. after pitching, which reached a maximum of 4–8×$10^7$ cells/ml. during the primary fermentation and declined to 1–3×$10^7$ cells/ml. at the end of the primary fermentation. Unmatured beer, which is freed from yeast by various methods at different stages of the secondary fermentation, was concentrated to 1/1.8 of its original volume by removing water through fractional crystallization with its mother liquor recycled. Analytical data on the chemical composition of the concentrates are shown in the Tables. Yeast prepared differently was added to each concentrate to give the cell density of the range $10^5$–$10^7$ cells/ml. After the addition of yeast, the concentrate was stored in a storage tank between 3–14 days at 0° C. The matured beer concentrate thus prepared, was filtered and bottled as the finished product with or without adding carbon dioxide. All of them showed excellent quality as beverages. On the other hand, said matured beer was filtered and bottled following the reconstitution by adding either water or water and carbon dioxide to the volume it occupied before concentration. Data on the chemical composition and the results of organoleptic test on taste of the reconstituted beer are shown in the Tables along with the Reference Example.

Reference Example was produced by a conventional procedure, in which the secondary fermentation was carried out after the primary fermentation for 60 days at 0° C, followed by filtration and bottling.

As is apparent from the data shown in the Tables, analytical data on the chemical composition obtained on the reconstituted beers and the reference gave almost identical values. Furthermore, the reconstituted beers are superior organoleptically over the reference, in spite of the shortened period of secondary fermentation of the present invention. Organoleptic test on taste was carried out as follows. 10 well trained panel persons were selected within our laboratory and breweries, and aroma and flavor were scored according to a 10 point basis. The average values are shown in the Tables. The organoleptic evaluation on the conventionally brewed beer was in the range of 8.0–8.5 points.

EXAMPLE 8 AND REFERENCE EXAMPLE 2

A wort for dark beer which contained 17 percent extract, was prepared. Its primary fermentation was conducted for 5 days at 18° C. After the removal of yeast through a diatomaceous earth filter, the filtrate was concentrated to one third of its original volume by freeze-concentration under reduced pressure. To the concentrate, pure cultured yeast was added to give the initial cell density of $10^7$ cells/ml. The secondary fermentation initiated was conducted for 3 days at 2° C. The finished beer concentrate can be served as a beverage without dilution. As shown in the Tables the data on the chemical composition and the evaluation by the organoleptic test on taste of the reconstituted beer was compared with those of dark beer prepared according to the conventional procedure.

EXAMPLE 9 AND REFERENCE EXAMPLE 3

The primary fermentation was conducted for 14 days at 11° C using wort for high alcoholic beer containing 16.6 percent extract, and then, the secondary fermentation was carried out for 21 days at 0° C. After the removal of yeast from the young beer, the filtrate was concentrated to 1/1.6 of its original volume by simple fractional crystallization. After the addition of yeast sediment recovered from a fermenter, the concentrate was kept for 7 days at 0° C to insure the maturation. The resulting concentrated product can be served as beverages without further treatment. The beer reconstituted in a similar manner as shown above was compared with the Reference beer 3 which had been matured for 60 days at 0° C by the conventional procedure. The results are given in the Tables.

EXAMPLE 10 AND REFERENCE EXAMPLE 4

Yeast was added to a wort for low alcoholic beer containing 10.2 percent extract. The primary fermentation was conducted for 3 days at 5° C, and the successive secondary fermentation was conducted for 7 days at 0° C. After the removal of yeast by filtration, the filtrate was concentrated to 1/1.6 of its original volume by simple fractional crystallization. Yeast sediment recovered from a fermenter was added to the concentrate, and maturation was conducted at 0° C for 7 days. The beer reconstituted in a similar manner as described above was compared with conventional beer (Reference Example 4) prepared according to the conventional procedure, in which the secondary fermentation was conducted for 60 days at 0° C. The test results are given in the Tables.

Table 1-1

| Example No. | Kind of beer | Period of secondary fermentation before concentration (days) | Method of removing yeast | Method of concentration | Rate of conc. (-fold) |
|---|---|---|---|---|---|
| 1 | Pale lager beer | 0 | Filtration with diatomaceous earth | Mother-liquor-recycling fractional crystallization | 1.8 |
| 2 | do. | 0 | Centrifugation | do. | 1.8 |
| 3 | do. | 3 | do. | do. | 1.8 |
| 4 | do. | 7 | Filtration with diatomaceous earth | do. | 1.8 |
| 5 | do. | 14 | do. | do. | 1.8 |
| 6 | do. | 21 | do. | do. | 1.8 |
| 7 | do. | 28 | Sedimentation | do. | 1.8 |
| 8 | Dark beer | 21 | Filtration with diatomaceous earth | Vacuum-freeze-concentrating method | 3.0 |
| 9 | High alcoholic beer | 21 | do. | Simple fractional crystallization | 1.6 |
| 10 | Low alcoholic beer | 7 | do. | do. | 1.6 |

Table 1-2

| Example No. | Chemical composition immediately after concentration | | | | Kind of yeast to be added | Conc. of yeast after addition (cells/ml) | Sec. ferm. after concentration | | Total of secondary fermentation period (days) |
|---|---|---|---|---|---|---|---|---|---|
| | Real Ex. (wt%) | Alc. (wt%) | Bitterness (ppm) | Diacetyl (ppm) | | | Temp (°C) | Period (days) | |
| 1 | 8.6 | 5.4 | 37.8 | 1.50 | Yeast sediment recovered from fermenter | $10^7$ | 0 | 14 | 14 |
| 2 | 8.6 | 5.4 | 37.5 | 1.48 | Yeast filtered away before concentration | $10^7$ | 0 | 14 | 14 |
| 3 | 7.6 | 5.6 | 36.6 | 1.22 | Yeast pure-cultured | $10^7$ | 0 | 14 | 17 |
| 4 | 7.4 | 5.9 | 36.0 | 0.84 | Yeast sediment recovered from fermenter | $10^7$ | 0 | 10 | 17 |
| 5 | 7.0 | 6.1 | 36.4 | 0.56 | do. | $10^7$ | 0 | 10 | 24 |
| 6 | 6.7 | 6.3 | 35.8 | 0.30 | Young beer during the course of primary fermentation | $10^6$ | 0 | 7 | 28 |
| 7 | 6.5 | 6.5 | 36.2 | 0.22 | do. | $10^5$ | 0 | 3 | 31 |
| 8 | 20.7 | 16.1 | 121.0 | 1.34 | Press yeast pure-cultured | $10^7$ | 2 | 3 | 24 |
| 9 | 6.2 | 10.8 | 17.8 | 1.05 | Yeast sediment recovered from fermenter | $10^7$ | 0 | 7 | 28 |
| 10 | 13.1 | 1.6 | 19.2 | 0.46 | do. | $10^5$ | 0 | 7 | 14 |

Table 1-3

| Example No. | Quality after reconstitution of final beers | | | | | |
|---|---|---|---|---|---|---|
| | Original Ex. (wt%) | Real Ex. (wt%) | Alc. (wt%) | Bitterness (ppm) | Diacetyl (ppm) | Organoleptic taste test (point) |
| 1 | 10.5 | 3.5 | 3.6 | 21.0 | 0.02 | 8.5 |
| 2 | 10.4 | 3.4 | 3.6 | 20.9 | 0.02 | 8.5 |
| 3 | 10.4 | 3.6 | 3.5 | 20.2 | 0.03 | 8.7 |
| 4 | 10.4 | 3.4 | 3.6 | 20.0 | 0.02 | 8.8 |
| 5 | 10.4 | 3.5 | 3.5 | 20.1 | 0.01 | 9.0 |
| 6 | 10.4 | 3.6 | 3.5 | 20.5 | 0.02 | 8.8 |
| 7 | 10.4 | 3.4 | 3.6 | 21.2 | 0.02 | 8.5 |
| 8 | 17.0 | 6.5 | 6.2 | 40.0 | 0.06 | 8.2 |
| 9 | 16.6 | 2.8 | 7.3 | 11.0 | 0.04 | 8.2 |
| 10 | 10.2 | 7.8 | 1.2 | 12.0 | 0.02 | 8.0 |

Table 2

| Example No. | Kind of beer | Secondary fermentation | | Quality after reconstitution of final beers | | | | | |
|---|---|---|---|---|---|---|---|---|---|
| | | Temp. (°C) | Period (days) | Original Ex. (wt%) | Real Ex. (wt%) | Alc. (wt%) | Bitterness (ppm) | Diacetyl (ppm) | Organoleptic taste test (point) |
| 1 | Pale lager beer | 0 | 60 | 10.5 | 3.5 | 3.6 | 23.0 | 0.02 | 8.5 |
| 2 | Dark beer | 0 | 90 | 17.0 | 6.5 | 6.2 | 43.0 | 0.05 | 8.2 |
| 3 | High alcoholic beer | 0 | 60 | 16.6 | 2.8 | 7.3 | 14.0 | 0.03 | 8.0 |
| 4 | Low alcoholic beer | 0 | 60 | 10.2 | 7.9 | 1.2 | 15.0 | 0.02 | 8.0 |

What is claimed is:

1. A process of producing an alcoholic malt beverage concentrate which comprises adding yeast to a wort to carry out primary fermentation, removing yeast from an unmatured malt beverage during or after the primary fermentation, concentrating said unmatured malt beverage freed from yeast by removing from 30 to 80 percent by volume of water present in said unmatured malt beverage freed from yeast, adding yeast to the resulting concentrate, and carrying out the maturation at a temperature of about 0° C. for from 3 to 14 days, and thereafter filtering and bottling the resulting beverage.

2. A process of producing an alcoholic malt beverage which comprises adding yeast to a wort to carry out primary fermentation, removing yeast from an unmatured malt beverage during or after the primary fermentation, concentrating said unmatured malt beverage freed from yeast by removing from 30 to 80 percent by volume of water present in said unmatured malt beverage freed from yeast, adding yeast to the resulting concentrate, and carrying out the maturation at a temperature of about 0° C. for from 3 to 14 days, then adding at least one of water and carbon dioxide to the resulting matured malt beverage concentrate, and thereafter filtering and bottling the resulting beverage.

3. A process according to claim 1 in which said unmatured malt beverage is concentrated by fractional crystallization and in which mother liquor so obtained is recycled.

4. A process according to claim 2 in which said unmatured malt beverage is concentrated by fractional crystallization and in which mother liquor so obtained is recycled.

5. A process according to claim 2 in which yeast to be added to a concentrate is yeast recovered from fermentation.

6. A process according to claim 2 in which yeast to be added to a concentrate is a young beer which is still in the course of primary fermentation.

7. A process according to claim 2 in which said malt beverage to be concentrated is a pale lager beer.

8. A process according to claim 2 in which said malt beverage to be concentrated is a dark beer.

9. A process according to claim 1 in which said unmatured malt beverage freed from yeast is concentrated to from 1/1.6 to ⅓ of its original volume.

10. A process according to claim 2 in which said unmatured malt beverage freed from yeast is concentrated to from 1/1.6 to ⅓ of its original volume.

* * * * *